United States Patent Office 2,913,303
Patented Nov. 17, 1959

2,913,303
DYEING OF POLYACRYLONITRILE AND COPOLYMERS OF ACRYLONITRILE

Hans Baumann, Ludwigshafen (Rhine), Friedrich Arnemann, Mannheim, Julius Eisele, Ludwigshafen (Rhine), and Wilhelm Federkiel, Frankenthal, Pfalz, Germany, assignors to Badische Anilin- & Soda-Fabrik Aktiengesellschaft, Ludwigshafen (Rhine), Germany No Drawing. Application April 17, 1957
Serial No. 653,296

Claims priority, application Germany August 14, 1956
20 Claims. (Cl. 8—55)

This invention relates to an improved process for dyeing polyacrylonitrile and copolymers of acrylonitrile.

We have found that acrylonitrile polymers, i.e. polyacrylonitrile and copolymers of acrylonitrile can be dyed in very fast, clear shades by using as dyestuffs water-soluble basic diazacyanine dyestuffs which are resonance-hybrids between the general Formulae Ia and Ib.

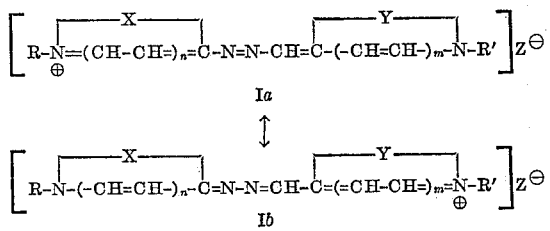

wherein $m$ and $n$ are zero or 1, X and Y are divalent organic bridge atoms or groups which make up the nitrogenous rings to five- or six-membered rings, R and R' are alkyl, aralkyl, aryl or cycloalkyl and R' or R may also be hydrogen, and $Z^{\ominus}$ is a water-soluble colorless, inorganic, organic or complex anion. Five- or six-membered rings of the kind indicated by the above general formulae are, for instance, thiazole, imidazole, pyrrolenine and pyridine rings and their benzo- and naphtho-derivatives.

Dyestuffs of the above general Formulae Ia →Ib can be prepared by various known methods for which no claim is made in the present application. Thus for example according to Fuchs and Grauaug (Ber. deutsch. Chem. Ges., Band 61 (1928), page 63) heterocyclic hydrazones of the general Formula II can be condensed with heterocyclic aldehydes of the general Formula III or their anils, salts or quaternization products:

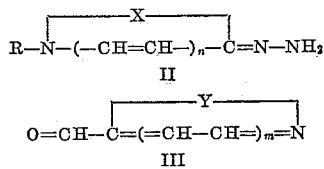

the resultant condensation products being aftertreated if need be with quaternizing agents, such as methyl iodide, dimethyl sulfate, toluene sulfonic acid ethyl ester, benzyl chloride, cyclohexyl bromide or cyclopentyl iodide.

Dyestuffs of the general Formulae Ia↔Ib are also obtained in many cases by diazotization of heterocyclic amines of the Formula IV and coupling with methylene bases of the Formula V:

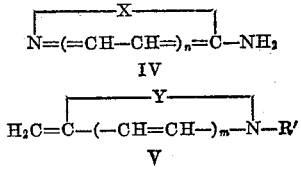

the condensation products again being aftertreated with quaternizing agents if desired.

A further method for obtaining dyestuffs of the general Formulae Ia↔Ib consists in condensing hydrazines corresponding to the amines IV with aldehydes of the Formula III and if desired quaternizing the condensation products.

The basic diazacyanine dyestuffs of the Formulae Ia↔Ib accessible in these various ways are used according to this invention for dyeing flocks, fibres, threads, bands, woven or knitted fabrics of pure polyacrylonitrile or of copolymers of acrylonitrile with up to about 50 percent of other vinyl compounds, such as vinyl chloride, vinylidene chloride, vinyl fluoride, vinyl acetate, vinyl propionate, vinylpyridine, vinylimidazole, vinyl alcohol, acrylic acid esters, methacrylic acid esters and/or acrylamide or methacrylamide.

The dyebaths are exhausted best in the acid pH range. It is possible however to dye in neutral to slightly alkaline baths; in this case it is often advantageous to lower the pH value during the dyeing process by adding small amounts of acid.

If, instead of the salt-like dyestuffs of the Formulae Ia↔Ib, there are used the corresponding, often almost colorless, color bases or anhydro bases, it has surprisingly been found that they go onto the fibres in the shade of color of the intensely colored dyestuff salts Ia↔Ib. The dyeings do not change their shade of color when given an alkaline washing.

The most favorable dyeing temperatures are somewhat different depending on the goods being dyed. In general the goods to be dyed are entered at about 40° to 60° C. and dyeing effected at the boiling temperature; it is also possible however to dye under static pressure at more than 100° C. up to about 135° C. The co-employment of the usual dyeing assistants is sometimes advantageous, but usually is unnecessary.

The dyestuffs can also be added to spinning solutions which contain polyacrylonitrile or copolymers of acrylonitrile with the above named other vinyl compounds. The spun-dyed structures thus obtained can if desired be further dyed or shaded in an aqueous bath with any dyestuffs having affinity to polyacrylonitrile, preferably the dyestuffs herein specified.

The dyeings obtained are characterized by lively, powerful shades and very good fastness, in many cases especially by excellent fastness to light.

The following examples will further illustrate this invention but the invention is not restricted to these examples. The parts specified in the examples are parts by weight.

*Example 1*

0.5 part of the basic diazacyanine dyestuff of the formulae

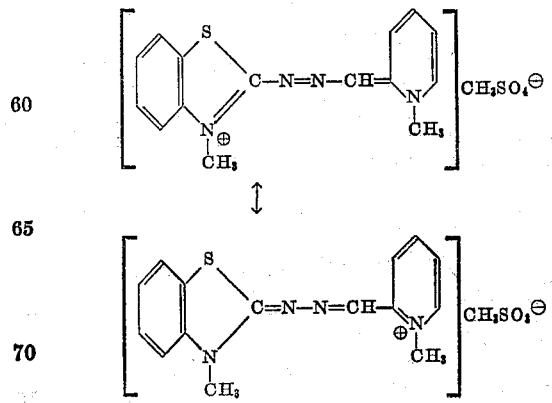

is dissolved in 4,000 parts of water with the addition of 5 parts of 30 percent acetic acid. 100 parts of a fabric of polyacrylonitrile staple fibre is entered at 50° C., heated to boiling in 30 minutes and kept at the boiling temperature for an hour. The fabric is then rinsed and dried. A powerful, reddish-yellow dyeing of very good fastness to moisture and excellent fastness to light is obtained.

Fast dyeings are obtained in the same way with the following dyestuffs (of which but one limiting formula of the resonating system is indicated:

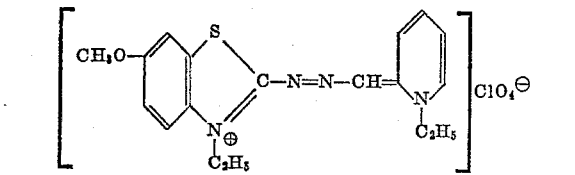

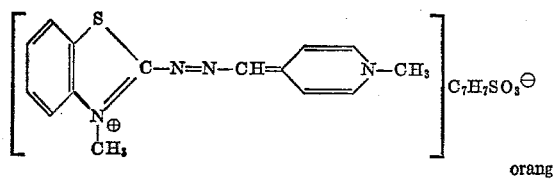

orange

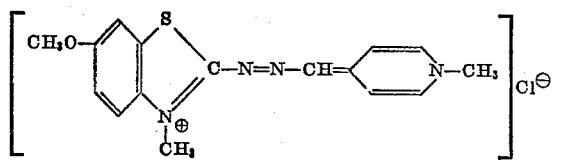

red-orange

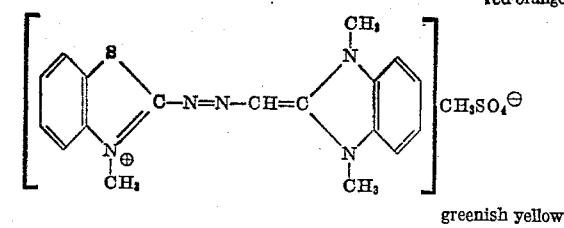

greenish yellow

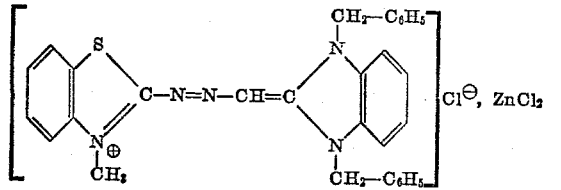

yellow

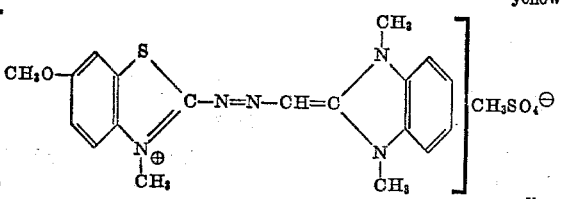

yellow

*Example 2*

100 parts of fibrous material of a copolymer prepared prepared from 95 percent of acrylonitrile and 5 percent of butyl-methacrylate are dyed in a bath containing in 5,000 parts of water 0.8 part of the basic diazacyanine dyestuff of the formulae:

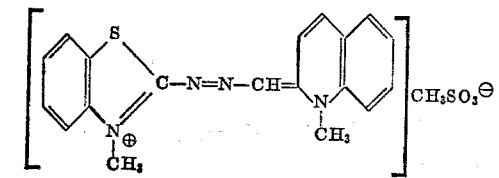 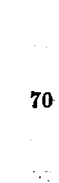

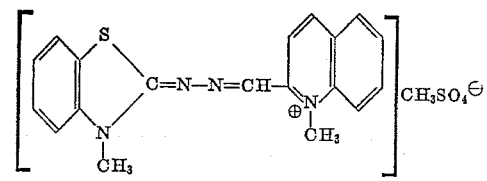

and 2 parts of chloracetic acid. The fibrous material is dyed a very fast and powerful red-orange.

The following dyestuffs (of which but one limiting formula is indicated) can be used in an analogous way:

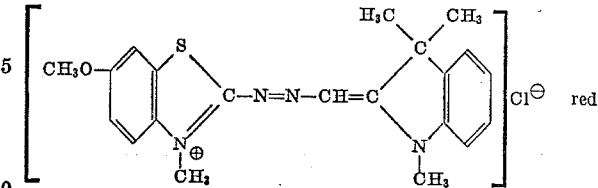 red

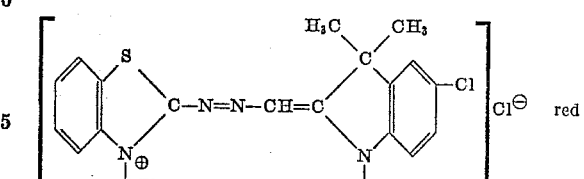 red

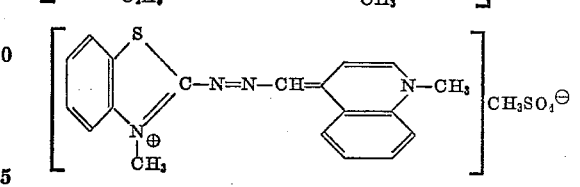

bluish-Bordeaux

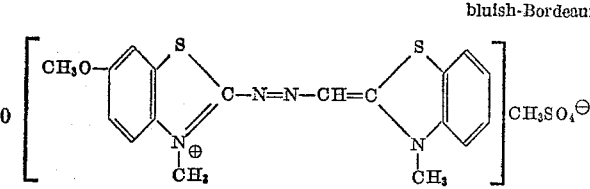 red

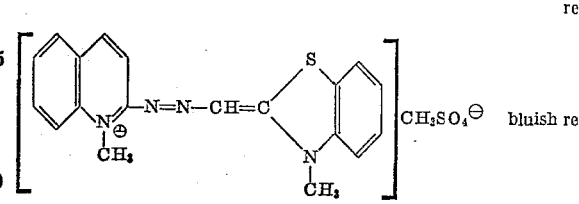 bluish red

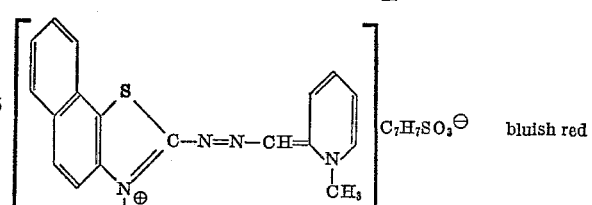 bluish red

*Example 3*

Polyacrylonitrile fibres are dyed as in Example 1 with a bath containing, in 4,000 parts of water, 5 parts of 30 percent acetic acid and 0.5 part of the dyestuff of the formulae:

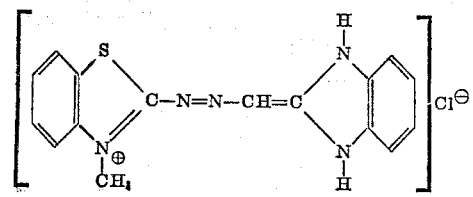

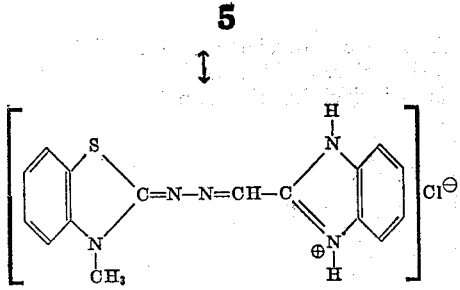

or the corresponding anhydro base of the formula:

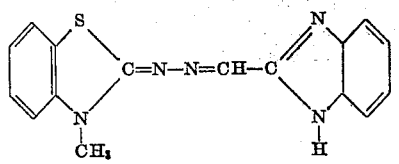

The fibres are dyed a powerful greenish-yellow; the dyeings have very good fastness to light.

In a similar way there may be used for dyeing the following anhydro bases or their hydrochlorides, sulfates, oxalates or chloracetates:

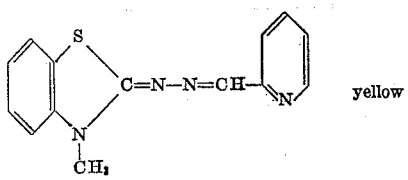   yellow

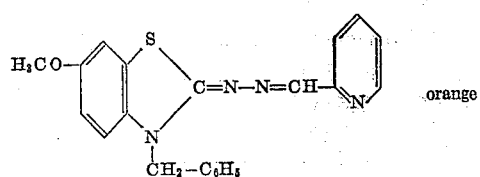   orange

What we claim is:

1. A polymer comprising at least 50% by weight of acrylonitrile dyed with a water-soluble basic diazacyanine dyestuff which is a resonance-hybrid between the general Formulae Ia and Ib Ia
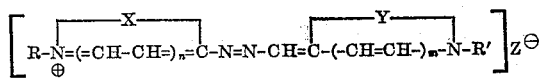

Ib
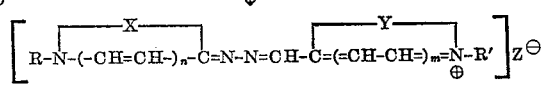

wherein $m$ and $n$ represent a number selected from zero and one, X and Y are divalent organic bridge groups which complete the nitrogenous rings of a ring system selected from the class consisting of thiazole, imidazole, pyrrolenine and pyridine rings, and R' represents a member of the class consisting of lower alkyl, cycloalkyl, benzyl and phenyl groups, and $Z^{\ominus}$ is a colorless, water-soluble anion.

2. A polymer comprising at least 50% by weight of acrylonitrile dyed with a basic diazacyanine dyestuff, the cation of which is a resonance-hybrid between the general formulae

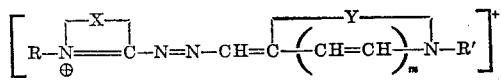

and

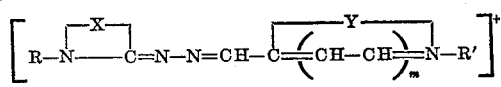

wherein $m$ is a symbol limited to 0 and 1, X and Y are divalent groups which completes the nitrogenous ring of a ring system selected from the class consisting of thiazole, imidazole, pyrrolenine and pyridine rings, and R' represents a member of the class consisting of lower alkyl, cycloalkyl, benzyl and phenyl groups.

3. The product of claim 2 wherein R is a saturated lower alkyl group.

4. The product of claim 2 wherein R' is a lower saturated alkyl group.

5. A synthetic polymeric fiber selected from the group consisting of polyacrylonitrile and copolymers comprising at least 50% by weight of acrylonitrile and a proportion less than 50% by weight of other vinyl compounds dyed with a basic diazacyanine dyestuff, the cation of which is a resonance-hybrid between the general formulae

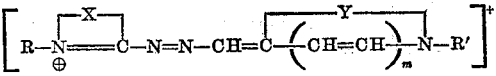

and

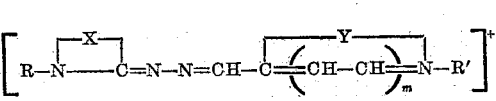

wherein $m$ is a symbol limited to 0 and 1, X and Y are divalent groups which completes the nitrogenous ring of a ring system selected from the class consisting of thiazole, imidazole, pyrrolenine and pyridine rings, and R' represents a member of the class consisting of lower alkyl, cycloalkyl, benzyl and phenyl groups.

6. The product of claim 2 wherein X and Y are thiazole ring completing groups and R and R' are lower, saturated alkyl groups.

7. The product of claim 2 wherein X and Y are pyridine ring completing groups and R and R' are lower, saturated alkyl groups.

8. The product of claim 2 wherein X and Y are thiazole ring and pyridine ring completing groups respectively, and R and R' are lower, saturated alkyl groups.

9. The product of claim 2 wherein X and Y are pyridine ring and thiazole ring completing groups respectively, and R and R' are lower, saturated alkyl groups.

10. A polymer containing at least 50% by weight acrylonitrile colored with a basic diazacyanine dyestuff, the cation of which has the formula

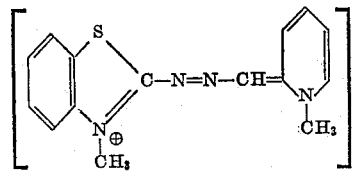

11. A polymer containing at least 50% by weight acrylonitrile colored with a basic diazacyanine dyestuff, the cation of which has the formula

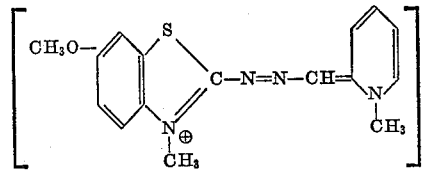

12. A polymer containing at least 50% by weight acrylonitrile colored with a basic diazacyanine dyestuff, the cation of which has the formula

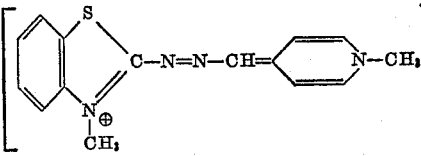

13. A polymer containing at least 50% by weight acrylonitrile colored with a basic diazacyanine dyestuff, the cation of which has the formula

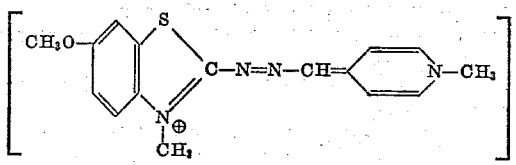

14. A polymer containing at least 50% by weight acrylonitrile colored with a basic diazacyanine dyestuff, the cation of which has the formula

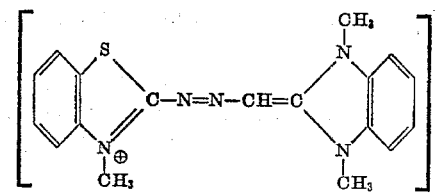

15. A polymer containing at least 50% by weight acrylonitrile colored with a basic diazacyanine dyestuff, the cation of which has the formula

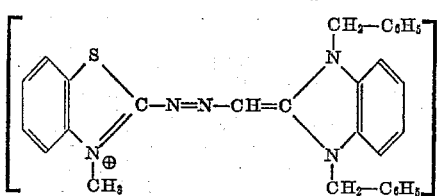

16. A polymer containing at least 50% by weight acrylonitrile colored with a basic diazacyanine dyestuff, the cation of which has the formula

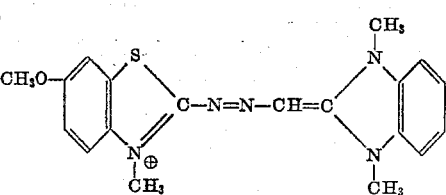

17. A polymer containing at least 50% by weight acrylonitrile colored with a basic diazacyanine dyestuff, the cation of which has the formula

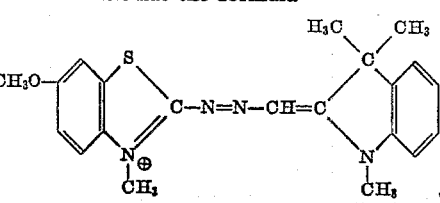

18. A polymer containing at least 50% by weight acrylonitrile colored with a basic diazacyanine dyestuff, the cation of which has the formula

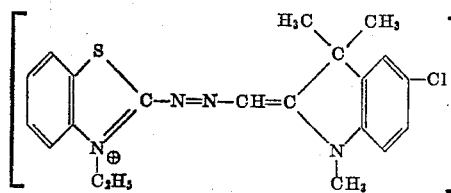

19. A polymer containing at least 50% by weight acrylonitrile colored with a basic diazacyanine dyestuff, the cation of which has the formula

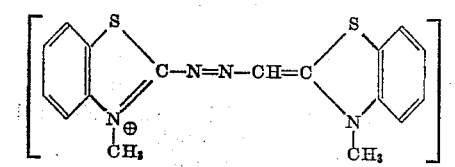

20. A polymer containing at least 50% by weight acrylonitrile colored with a basic diazacyanine dyestuff, the cation of which has the formula

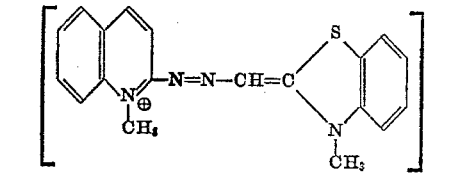

References Cited in the file of this patent
UNITED STATES PATENTS

| | | |
|---|---|---|
| 2,764,466 | Bidgood | Sept. 25, 1956 |
| 2,815,338 | Ruegg | Dec. 3, 1957 |
| 2,821,526 | Boyd | Jan. 28, 1958 |

OTHER REFERENCES

Clarke and Bidgood: "The Dyeing of Orlon Type–42 Acrylic Fiber with Cationic Dyes," Am. Dyestuff Rep., August 29, 1955, pp. 631–640.

Kramrisch: "Some Investigation into the Application of Dyes to Acrylic Fibers," J.S.D.C., March 1957, pp. 85–92.

Hindle: Am. Dyestuff Rep., January 16, 1956, p. 34.

UNITED STATES PATENT OFFICE

CERTIFICATE OF CORRECTION

Patent No. 2,913,303                      November 17, 1959

Hans Baumann et al.

It is hereby certified that error appears in the printed specification of the above numbered patent requiring correction and that the said Letters Patent should read as corrected below.

Column 5, line 57, column 6, lines 1 and 2, and column 6, lines 28 and 29, for "and R' represents" read -- R and R' represent --.

Signed and sealed this 9th day of August 1960.

(SEAL)
Attest:

KARL H. AXLINE                       ROBERT C. WATSON
Attesting Officer                  Commissioner of Patents